United States Patent [19]
Brunella

[11] Patent Number: 5,265,652
[45] Date of Patent: Nov. 30, 1993

[54] MULTIAXIAL FUEL TRANSFER PIPE SYSTEM

[75] Inventor: Alfred J. Brunella, Compton, Calif.
[73] Assignee: Couple-Up, Inc., Compton, Calif.
[21] Appl. No.: 889,958
[22] Filed: May 29, 1992
[51] Int. Cl.$^5$ .............................................. B67D 5/06
[52] U.S. Cl. ............................... 141/59; 141/45; 141/86; 141/98; 141/290; 73/40.5 R; 73/49.1; 137/234.6; 137/312; 137/364; 137/372; 285/133.1; 285/93; 285/161; 285/206; 285/236; 285/256; 285/336; 138/104; 138/112; 138/113; 138/114
[58] Field of Search ........... 73/40.5 R, 40.7, 46, 73/49.1, 49.2 R, 49.2 T, 49.5, 49.8; 141/44-46, 59, 86, 88, 98, 285, 290; 137/234.6, 236.1, 312-314, 363-365, 368, 372; 285/133.1, 93, 161, 206, 236, 256, 336; 405/53-55, 154; 138/104, 111-114

[56] References Cited

U.S. PATENT DOCUMENTS

| | | | |
|---|---|---|---|
| 3,016,928 | 10/1962 | Brandt | 141/45 |
| 3,185,500 | 5/1965 | Luther | 285/256 X |
| 4,440,154 | 4/1984 | Bellows | 138/112 X |
| 4,718,568 | 1/1988 | Dal Palu | 138/113 X |
| 4,732,414 | 3/1988 | Inaba | 285/133.1 |
| 4,754,782 | 7/1988 | Grantham | 138/113 |
| 4,805,444 | 2/1989 | Webb | 73/40.5 R |
| 4,827,960 | 5/1969 | Nitzberg et al. | 137/68.1 |
| 4,828,183 | 5/1989 | Fink, Jr. | 239/569 |
| 4,871,084 | 10/1989 | Robbins | 137/363 |
| 4,922,971 | 5/1990 | Grantham | 141/1 |
| 4,926,899 | 5/1990 | Argandona | 137/364 |
| 4,932,257 | 6/1990 | Webb | 73/40.5 R |
| 4,951,720 | 8/1990 | Grantham | 141/44 |
| 5,005,613 | 4/1991 | Stanley | 141/45 |
| 5,042,537 | 8/1991 | Grantham | 141/59 |
| 5,054,523 | 8/1991 | Rink | 137/377 |
| 5,088,528 | 2/1992 | Grantham | 141/44 |
| 5,088,774 | 2/1992 | Spiegelman | 285/133.1 |
| 5,102,012 | 4/1992 | Foster | 222/40 |
| 5,129,684 | 7/1992 | Lawrence et al. | 285/161 |

FOREIGN PATENT DOCUMENTS

| | | | |
|---|---|---|---|
| 0343884 | 11/1989 | European Pat. Off. | 141/285 |
| 1054035 | 1/1967 | United Kingdom | 285/133.1 |

Primary Examiner—J. Casimer Jacyna
Attorney, Agent, or Firm—Kelly Bauersfeld & Lowry

[57] ABSTRACT

A multiaxial pipe system is provided particularly for use in underground fuel transfer between a fuel storage tank and one or more dispensing pumps. The pipe system includes a primary fuel flow line and a vapor recovery line mounted within a common outer containment conduit. Adapter fittings are provided on the ends of the fuel flow and vapor recovery lines for quick and easy connection to biaxial pipe fittings located respectively at the fuel storage tank and at each dispensing pump.

20 Claims, 5 Drawing Sheets

MULTIAXIAL FUEL TRANSFER PIPE SYSTEM

BACKGROUND OF THE INVENTION

This invention relates generally to improvements in fluid transfer pipe systems, particularly of the type used for transferring liquid fuel from an underground storage tank to one or more dispensing pumps. More specifically, this invention relates to an improved multiaxial fluid transfer pipe system adapted for facilitated installation and improved operational performance with respect to liquid fuel dispensing concurrently with recovery and recirculation of fuel vapors.

Pipe systems and networks for use in transferring liquid fuel from an underground fuel storage tank to an above-ground dispensing pump are well-known in the art, particularly in the context of automobile service stations. In this regard, the liquid fuel such as gasoline is traditionally stored in an underground fuel storage tank in convenient proximity to one or more dispensing pumps. The storage tank and the dispensing pump normally include suitable shut-off valve devices located within a shallow sump for easy access by service station personnel. The transfer pipe system is normally installed underground in a position connected between the tank and pump sumps for fuel transfer and dispensing when the pump is operated.

In the past, buried fuel storage tanks and transfer pipe systems associated therewith were constructed from convenient and relatively inexpensive materials such as steel plate, iron piping, etc. However, these iron-based materials were subject to corrosion, resulting in eventual failure of the storage tank and/or the related transfer pipe system. Such failures unfortunately resulted in leakage of the liquid fuel into the surrounding soil, creating a substantial risk of ground water contamination.

In recent years, new and improved fuel storage tanks and related pipe systems have been constructed from noncorrosive materials, such as fiberglass and the like. In such installations, a primary fuel transfer pipe or conduit is commonly mounted within an outer containment conduit to provide a double-walled construction intended to further reduce the risk of fuel leakage. Unfortunately, a double-walled pipe system of this type requires a complex assembly of pipe components and fittings which are assembled piecemeal by means of a large number of threaded or adhesively joined connectors, resulting in a piping network which is both difficult and costly to install.

In addition, governmental air quality regulations now frequently require a vapor recovery system to prevent escape of excessive fuel vapors to the air when fuel is dispensed. The vapor recovery system normally comprises a separate flow line associated with a vacuum pump to draw fuel vapor from a dispensing nozzle to the underground fuel storage tank for recondensation. The inclusion of the vapor recovery line, which is also formed from assembled pipe components and fittings of preferably noncorrosive material, further increases the overall cost and complexity of the fuel transfer pipe network. Moreover, a portion of the recirculated fuel vapor tends to recondense within the vapor recovery line, whereby the inclination angle of the installed vapor recovery line must be carefully controlled to prevent vapor lock. In addition, the vapor recovery line provides a separate fuel leakage site in the event of line failure.

There exists, therefore, a significant need for improvements in fuel transfer pipe systems of the type used in a fuel transfer and dispensing environment. There exists a particular need for a simplified pipe system having a primary fuel flow line and a vapor recovery line adapted for simplified and easy installation within a protective outer containment conduit. The present invention fulfills these needs and provides further related advantages.

SUMMARY OF THE INVENTION

In accordance with the invention, an improved multiaxial pipe system is provided, particularly for use in underground fuel transfer between a buried fuel storage tank and one or more fuel dispensing pumps. The pipe system generally includes a primary fuel flow line and a vapor recovery line mounted for passage through a common outer containment conduit. The containment conduit extends between a pair of sumps associated respectively with the fuel storage tank and the dispensing pumps. Adapter fittings on the fuel and vapor recovery lines accommodate quick and easy connection to biaxial pipe fittings and/or related shut-off valve devices mounted within the tank and pump sumps.

In the preferred form, the outer containment conduit as well as the fuel flow and vapor recovery lines are constructed from a noncorrosive material, such as rigid or flexible fiberglass or the like. Means are provided for mounting opposite ends of the containment conduit for sealed passage through openings formed in the sump walls associated respectively with the fuel storage tank and the dispensing pumps. The containment conduit defines an uninterrupted buried passage extending between the fuel storage tank and the dispensing pumps.

The primary fuel flow line and the vapor recovery line extend through the outer containment conduit, with opposite ends of said flow lines disposed respectively within the sumps associated with the fuel storage tank and the dispensing pumps. In the preferred geometry, the vapor recovery line is received directly within the fuel flow line, which is installed in turn for passage through the outer containment conduit.

Within each sump, the adapter fittings are mounted on the ends of the fuel flow and vapor recovery lines for rapid assembly with a biaxial pipe fitting. Within the tank sump, the pipe fitting defines a fuel flow path for liquid fuel delivery to the fuel flow line, and a parallel vapor recovery path for recirculation of recaptured vapors and recondensed fuel to the storage tank. At the pump sump, the pipe fitting defines a fuel dispense path for flow of liquid fuel from the primary fuel line to the dispensing pump, and a parallel vapor recovery path for recirculation flow of vapors to the vapor recovery line. In each instance, within each sump, a containment cuff provides a sealed connection between the outer containment conduit and the exterior of the fuel flow line.

The adapter fittings include a tubular nipple defining an open-ended annular chamber at one end thereof for slide-in reception of and clamp-fit locking onto the end of the vapor recovery line. The nipple is seated within a cylindrical support sleeve on an eccentric spider which is seated in turn within one end of an inner mandrel adapted for press-fit reception into the end of the fuel flow line. The mandrel cooperates with an outer ferrule for clamp-on locking onto the end of the fuel flow line. A radially enlarged flange on an outboard end of the mandrel mates in facing relation with a corresponding flange on the adjacent biaxial pipe fitting, with a sealing gasket interposed therebetween. A circumferential clamp retains the flanges in face-to-face relation compressively engaging the sealing gasket.

In accordance with one aspect of the invention, the eccentric spider supports and retains the vapor recovery line for simple slide-fit reception of the tubular nipple thereon into the vapor recovery path of the adjacent pipe fitting. This slide-fit engagement occurs as the flanges on the mandrel and the adjacent pipe fitting are brought together for clamped interconnection, resulting additionally in aligned connection of the fuel flow line with the pipe fitting fuel flow path. The eccentric configuration of the spider presents a relative minimum profile to avoid undue obstruction of the fuel flow line. In addition, the eccentric spider retains the vapors recovery line in a position offset below a longitudinal centerline of the fuel flow line, to extend along the bottom of the fuel flow line for the entire length thereof, such that the inclination angle of vapor recovery line can be closely controlled.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
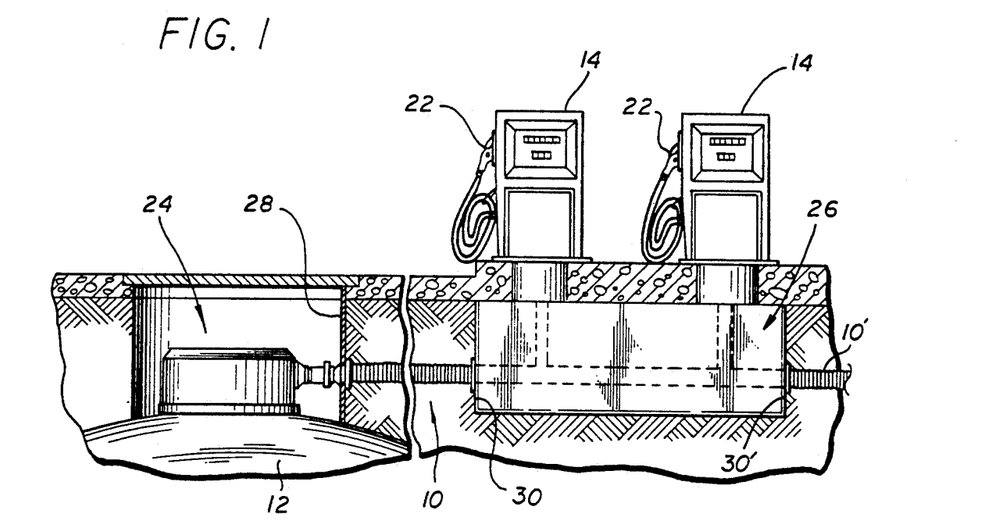
FIG. 1 is a somewhat schematic diagram illustrating a multiaxial pipe system embodying the novel features of the invention, for use in transferring fuel between an underground fuel storage tank and fuel dispensing pumps.

As shown in the exemplary drawings, an improved and multiaxial fuel transfer pipe system referred to generally in FIG. 1 by the reference numeral 10 is provided for transferring liquid fuel and recycling fuel vapors between an underground fuel storage tank 12 and one or more fuel dispensing pumps 14. The pipe system 10 includes a primary fuel flow line 16 and a vapor recovery line 18 (FIG. 2), both of which are installed within a protective outer containment conduit 20. This multiaxial system is adapted for quick and easy interconnection, in an underground application, between the fuel storage tank 12 and the fuel dispensing pumps 14.

The multiaxial fuel transfer pipe system 10 of the present invention is particularly designed for use in gasoline service station applications and the like wherein one or more fuel dispensing pumps 14 equipped with individual dispensing nozzles 22 are provided for use in dispensing a liquid fuel such as gasoline from the underground storage tank 12. In a typical installation, the storage tank 12 is buried at a location in convenient proximity to the fuel dispensing pumps 14, with an upper portion of the tank including appropriate control valve devices accessibly positioned within a shallow sump 24. The containment conduit 20 with the fuel flow and vapor recovery lines 16, 18 therein extends underground to interconnect the control valve devices within the tank sump 24 with counterpart control valve devices (not shown) and/or related pipe fittings mounted within a shallow sump 26 positioned at or in close proximity to the dispensing pumps 14. In this regard, as shown in FIG. 1, multiple dispensing pumps 14 are typically grouped together in a so-called island configuration generally overlying or closely adjacent to the pump sump 26. Moreover, the multiaxial pipe system 10 which interconnects the tank and pump sumps 24 and 26 may include additional piping segments 10' for series flow connection of the illustrative pump sump 26 with one or more additional pump sumps associated with additional dispensing pumps 14.

In general terms, the outer containment conduit 20 is connected between the walls of adjacent sumps, such as the walls 28 and 30 associated respectively with the tank sump 24 and the pump sump 26. The containment conduit 20, formed preferably of a noncorrosive material such as rigid or flexible fiberglass, defines a relatively large and uninterrupted passage extending underground between the storage tank 12 and the dispensing pumps 14. The fuel flow line 16 and the vapor recovery line 18 both pass through the outer containment conduit 20, preferably in a configuration with the vapor recovery line 18 mounted within and extending along an interior bottom surface of the fuel flow line 16. Adapter fittings are mounted at the ends of the fuel flow and vapor recovery lines 16, 18 within each sump, wherein these adapter fittings are designed for quick and easy connection to biaxial pipe fittings having separate fuel flow and vapor flow paths formed therein.

Figure 2:
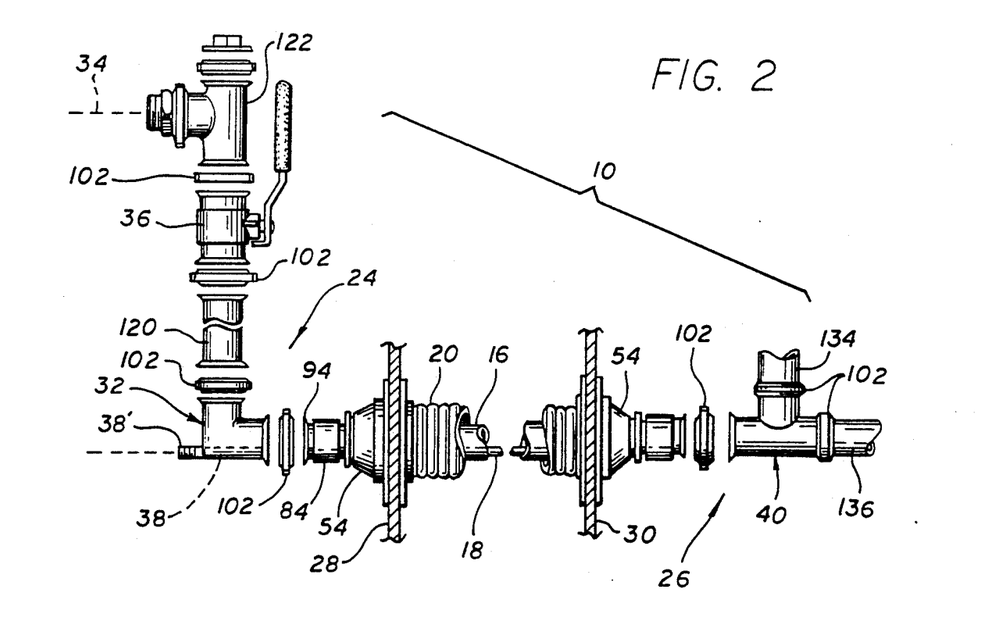
FIG. 2 is a fragmented and exploded view representing components of the multiaxial pipe system.

As shown in FIG. 2, the configuration of the biaxial pipe fitting attached to the fuel flow and vapor recovery lines 16, 18, varies in accordance with the particular location within the fuel flow system. For example, within the tank sump 24, a pipe fitting 32 formed from a brass casting or the like has a generally elbow or L-shaped geometry for connecting a liquid fuel flow to the fuel flow line 16. As shown, this flow of liquid fuel is obtained via a supply conduit 34 connected to a lower region of the buried storage tank 12, with a shut-off valve 36 mounted accessible within the sump 24 to permit manual fuel flow interruption. The pipe fitting 32 additionally includes an integrally formed vapor recovery conduit 38 adapted for in-line connection to the vapor recovery line 18, with a protruding threaded nipple 38' being provided for connecting recaptured fuel vapors typically via a vacuum pump (not shown) to an upper region of the fuel storage tank. By contrast, within the pump sump 26, a biaxial pipe fitting 40 is shown in FIG. 2 to have a tee-shaped geometry with parallel fuel flow and vapor recovery flow paths. This tee fitting 40 permits the pipe system 10 to be connected with multiple dispensing pumps 14 for fuel dispensing and vapor recovery, as will be described in more detail.

Figure 3:
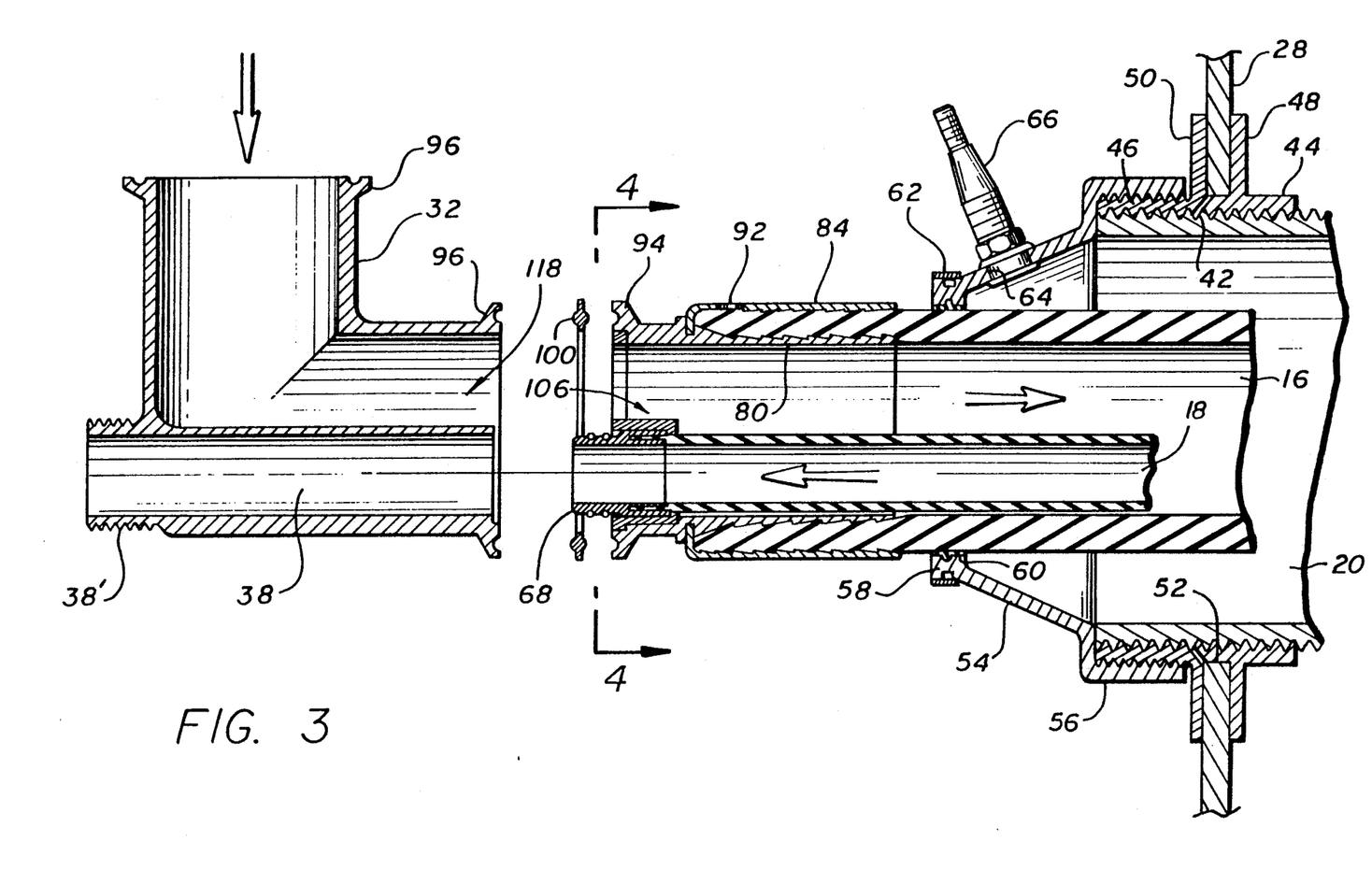
FIG. 3 is an enlarged exploded sectional view illustrating assembly of pipe system components.

FIG. 3 illustrates installation of the pipe system 10 for sealed passage through the sump wall 28 associated with the fuel storage tank 12. The adapter fittings on the fuel flow and vapor recovery lines 16, 18, provide quick and easy assembly with the associated biaxial pipe fitting 32. It will be understood that a similar mechanical connection arrangement is provided for sealed connection of the pipe system 10 with the wall 30 of the pump sump 26, and for coupling of the fuel flow and vapor recovery lines 16, 18 to the tee-shaped pipe fitting 40.

More particularly, with reference to FIG. 3, the outer containment conduit 20 is shown to have a generally corrugated construction to define a somewhat flexible structure extending underground between the tank sump 24 and the pump sump 26. The corrugated conduit configuration is adapted for thread-in mounting into a threaded bore 42 defined cooperatively by a coaxial pair of mounting sleeves 44 and 46 having outwardly radiating flanges 48, 50 respectively secured by a sealing adhesive or the like on opposite sides of the sump wall 28. The threaded bore 42 extends through an opening 52 in the sump wall 28. A positively sealed connection between the containment conduit 20 and the mounting sleeves 44, 46 may be obtained by applying sealing adhesive to the threaded connection therebetween.

The primary fuel flow line 16 and vapor recovery line 18 are also formed from noncorrosive materials, such as a rigid or flexible fiberglass hose material. The fuel flow line 16 is installed for direct and generally coaxial passage through the outer containment conduit 20. The vapor recovery line 18 is in the preferred form mounted in turn within the fuel flow line 16, and normally rests by gravity generally at an interior bottom surface of the fuel flow line 16. The lengths of the fuel flow and vapor recovery lines 16, 18 are selected to protrude a short distance beyond the corresponding ends of the containment conduit 20, whereby the fuel flow and vapor recovery lines 16, 18 protrude a short distance into the sumps.

A containment cuff 54 of generally truncated conical shape is provided for sealed interconnection between the outer containment conduit 20 and the exterior surface of the fuel flow line 16, at the inboard side of each sump wall. FIG. 3 shows the containment cuff 54 to include a threaded cylindrical base 56 adapted for thread-on mounting about the inboard mounting sleeve 46. From the base 56, the cuff 54 extends axially and radially inwardly, terminating with a clamp ring 58 which supports a seal gasket 60 against the exterior diameter surface of the fuel flow line 16. An annular clamp member 62 is normally provided for secure sealed interconnection between the containment cuff 54 and the flow line 16. In this arrangement, the fuel flow line is typically installed in a nearly horizontal orientation to extend from the fuel tank sump to the pump sump with a slight inclination angle of a few degrees.

A pressure test port 64 is formed in the containment cuff 54 mounted at one or both ends of the outer containment conduit 20. A pressure valve 66 is mounted within the test port 64 for selective admission of air or other suitable gas under pressure. In this manner, the interior of the containment conduit 20 may be pressurized to a selected level, typically on the order of 10 to 15 psi, and the pressure monitored by a gauge (not shown) to confirm the absence of system leaks.

The adapter fittings are designed for quick and easy clamp-fit mounting onto the exposed ends of the fuel flow and vapor recovery lines 16, 18 within each sump. The adapter fittings are constructed from rigid and preferably noncorrosive materials, such as suitable metal components, with a configuration suited for facilitated connection to the associated biaxial pipe fitting.

Figures 4, 5, 6:
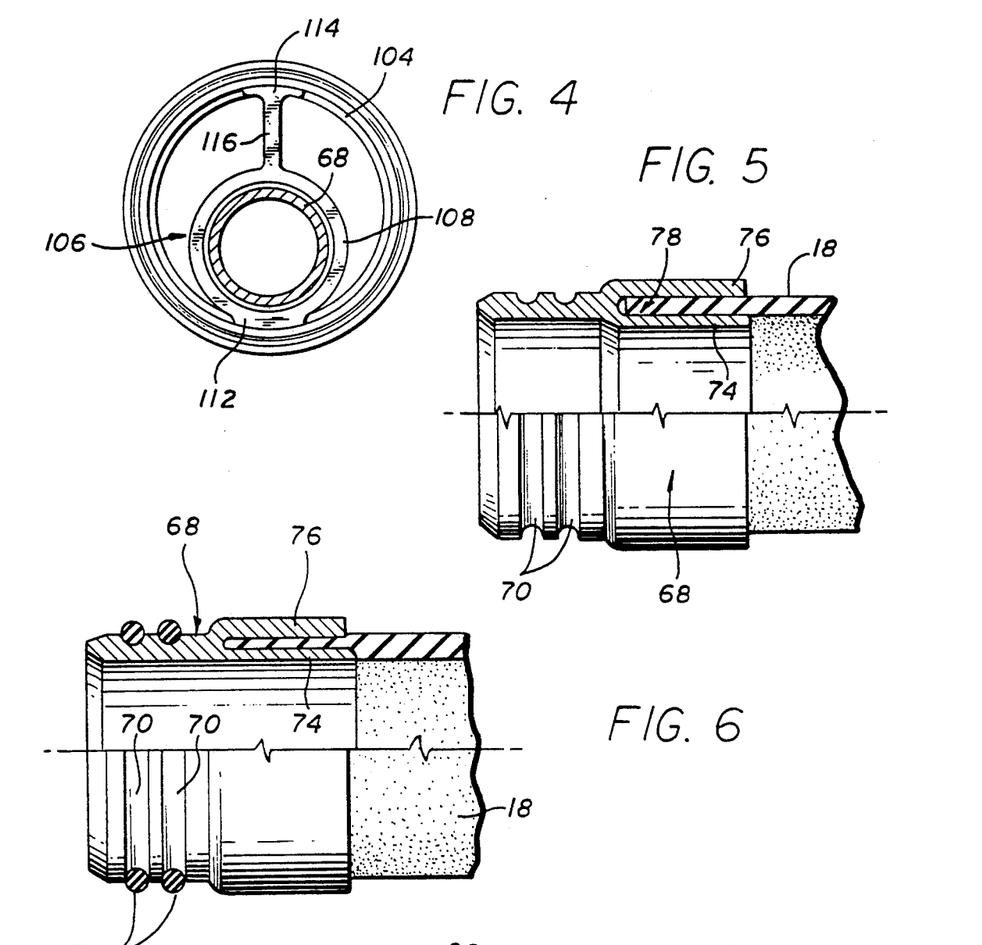
FIG. 4 is an enlarged vertical sectional view taken generally on the line 4—4 of FIG. 3.
FIG. 5 is an enlarged fragmented elevational view, shown partially in vertical section, and depicting assembly of a tubular nipple at one end of a vapor recovery line.
FIG. 6 is an elevational view generally similar to FIG. 5, shown partially in vertical section, and illustrating the tubular nipple clamped onto the vapor recovery line.

More particularly, as shown in FIGS. 3, 5 and 6, the adapter fittings include a tubular nipple 68 formed from brass or the like for secure mounting onto the end of the vapor recovery line 18. A forward end of the nipple 68 has a cylindrical configuration with an axially spaced pair of circumferential grooves 70 formed therein for seated reception of a corresponding pair of conventional O-ring seals 72. This forward end of the nipple 68 is designed for slide-fit reception into the tubular upper recovery conduit 38 formed as an integral portion of the adjacent pipe fitting 32.

The opposite or rear end of the tubular nipple 68 includes a radially spaced pair of axially extending legs 74 and 76 which cooperatively define an axially open annular chamber 78 sized for slide-fit reception of the end of the vapor recovery line 18. When the vapor line 18 is seated within the chamber 78 as viewed in FIG. 5, an appropriate expansion tool (not shown) may be employed to radially expand the inner leg 74 for tight clamp-fit engagement of the vapor line 18. In this configuration, as shown in FIG. 6, the interior of the nipple 68 has a substantially uninterrupted, smooth-bore configuration which cooperates with the inner diameter of the vapor line 18 to define a substantially unrestricted cross sectional vapor flow path area.

Figure 7:
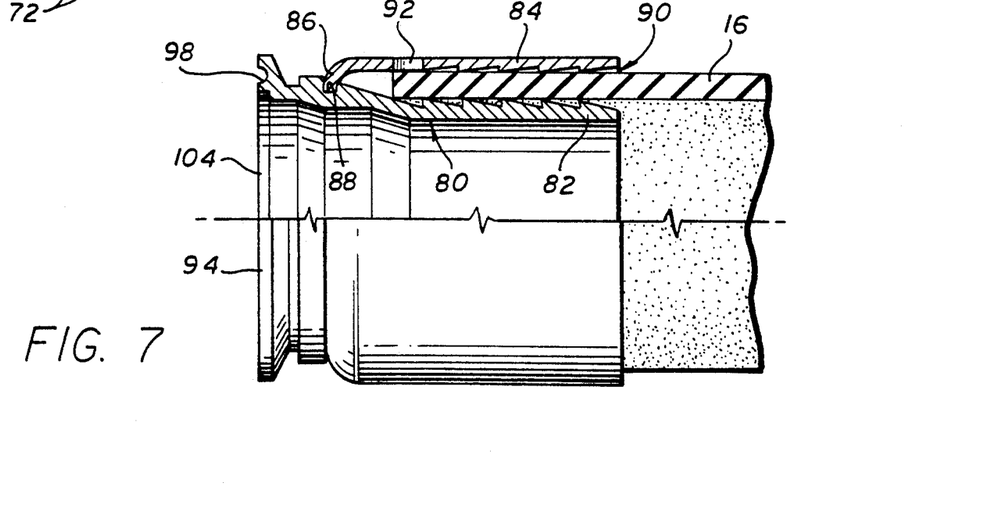
FIG. 7 is an enlarged elevational view, shown partially in vertical section, depicting assembly of an inner mandrel and outer ferrule onto one end of a fuel flow line.

The adaptor fittings further include an inner mandrel 80 of generally cylindrical shape which is also formed from brass or the like for slide-fit reception into the open end of the fuel flow line 16. As shown in FIG. 7, the inner mandrel 80 has an externally barbed rear and segment 82 for slide-fit positioning in gripped relation into the fuel flow line 16. An outer cylindrical ferrule 84 of rigid stainless steel or the like includes a radially inturned forward lip 86 seated within an outer groove 88 on the mandrel 80. From the lip 86, the ferrule 84 extends axially in radially outward spaced relation with the barbed mandrel segment 82 to define a rearwardly open annular cavity 90 for slide-fit reception of the end of the fuel flow line 16. An inner diameter surface of the ferrule 84 is, in the preferred form, also provided with a barbed construction for securely gripping the line 16. A sight port 92 is also formed in the ferrule 84 at a position near the inturned lip 86.

Figure 8:
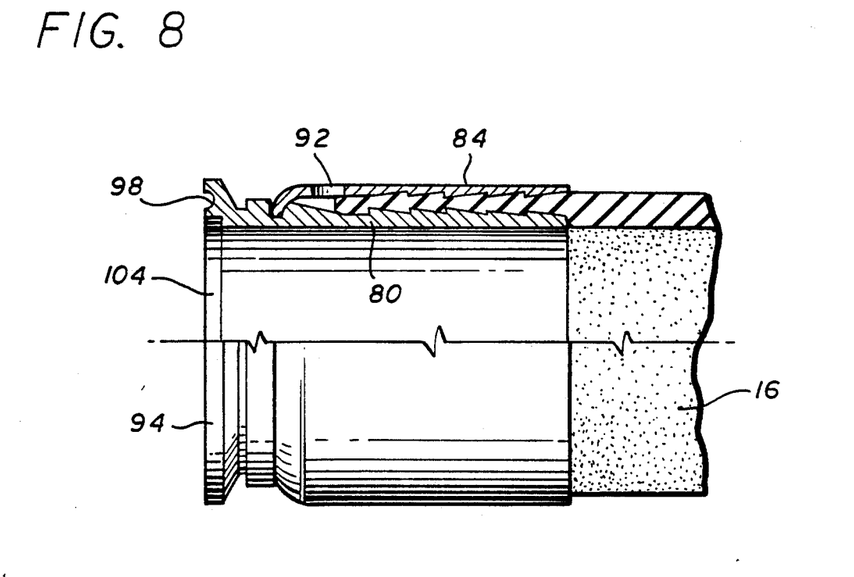
FIG. 8 is an elevational view generally similar to FIG. 7, shown partially in vertical section, and illustrating the mandrel and ferrule clamped onto the fuel flow line.

When the end of the fuel flow line 16 is substantially fully received into the interior of the annular cavity 90, defined by the space between the inner mandrel 80 and outer ferrule 84, an expansion tool (not shown) may be utilized to radially expand the mandrel rear segment 82 into tight clamping engagement with the flow line 16. In this configuration, as shown in FIG. 8, an inner diameter surface of the expanded mandrel 80 defines a smooth uninterrupted bore of substantially the same cross sectional flow area as the inner diameter of the fuel flow line 16.

An axially outboard end of the mandrel 80 defines a radially outwardly projecting coupling flange 94 for face-to-face mounting with a complementary shaped coupling flange 96 on the end of the pipe fitting 32. In the preferred form, these mated flanges 94, 96 include semicircular grooves 98 disposed in face-to-face relation for seated reception of a seal gasket 100 formed preferably from a malleable metal such as copper. A circumferential clamp 102 is wrapped about the mated flanges 94, 96 for compressively engaging angularly tapered surfaces thereon to draw and retain the flanges in interconnected relation. A preferred circumferential clamp comprises a wraparound clamp of the type marketed by Tri-Clover, Inc., of Kenosha, Wis. under the name Tri-Clamp.

The inner mandrel 80 additionally includes a recessed annular step 104 formed at the axially outboard end thereof for receiving and supporting an eccentric spider 106 used to retain and support the vapor recovery line 18. As shown best in FIGS. 3, 4 and 9, the eccentric spider comprises a cylindrical support sleeve 108 having a size and shape for slide-fit reception of the tubular nipple 68 on the vapor recovery line 18. A radially inturned shoulder 110 on the axially inboard end of the support sleeve 108 provides backstop support for the tubular nipple 68 as the nipple is advanced into the fitting conduit 38. A lower foot 112 (FIG. 4) on the support sleeve 108 cooperates with a head 114 formed on the distal end of a thin support arm 116 to position the spider 106 relative to the fuel flow line 16. In particular, the foot and head 114, 116 of the spider 106 seat within the recessed step 104 on the mandrel 80.

Figure 9:
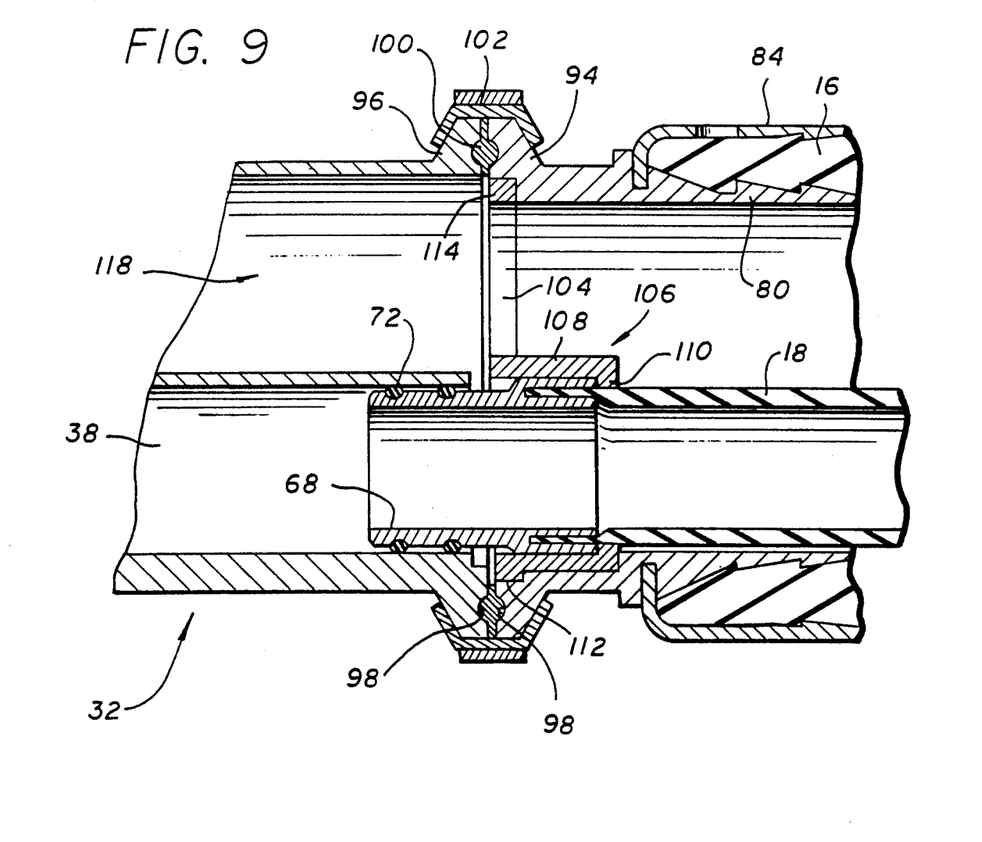
FIG. 9 is an enlarged fragmented vertical sectional view, similar to a portion of FIG. 3, and depicting the fuel flow and vapor recovery lines assembled in in-line flow relation with a biaxial pipe fitting.

As the coupling flanges 94, 96 are assembled, the eccentric spider 106 supports and retains the tubular nipple 68 for slide-fit placement into the vapor recovery conduit 38. The fuel flow and vapor recovery flow lines 16, 18 thus fit quickly and easily in flow-coupled relation with a fuel flow path 118 and with the vapor recovery conduit 38 of the pipe fitting 32 (FIGS. 3 and 9).

Within the tank sump 24, as shown in FIG. 2, the biaxial pipe fitting 32 provides for separate flow of liquid fuel and recovered vapor, as previously described. In this regard, an opposite end of the pipe fitting 32 includes a second coupling flange 96 shown for face-to-face connection with an extension conduit 120, which is assembled in turn with additional pipe components such as the shut-off valve 36, and a tee fitting 122 adapted for connection to the fuel supply conduit 34. A plurality of the circumferential clamps 102 permits rapid and simple component assembly, with the pipe fitting 32 rotationally oriented relative to the fuel flow line 16 in a precision manner, before the clamps 102 are fully tightened. Conveniently, the spider 106 is capable of rotational displacement within the fuel flow line 16 before the associated clamp 102 is tightened, whereby the pipe fitting 32 can be oriented in virtually any selected angle with respect to the fuel flow line 16.

Figure 10:
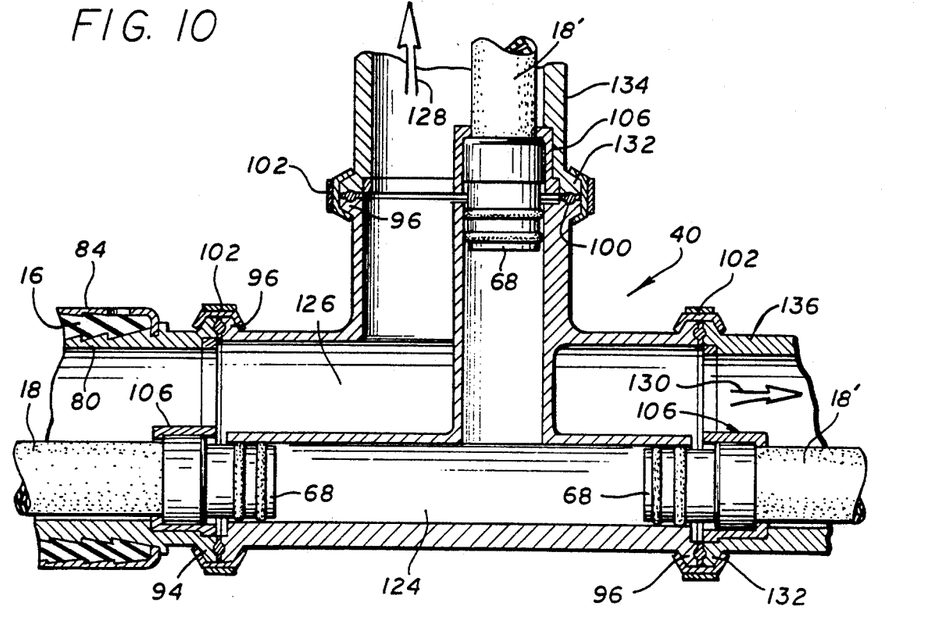
FIG. 10 is a fragmented sectional view illustrating connection of the fuel flow and vapor recovery lines to a biaxial pipe fitting of tee-shaped configuration.

FIG. 10 shows the tee fitting 40 connected to the ends of the fuel flow and vapor recovery lines 16, 18 within the pump sump 26 (FIGS. 1 and 2). As shown, the tee fitting 40 includes a vapor recovery conduit 124 of tee-shaped configuration formed integrally within the fitting which also includes a parallel primary fuel flow path 126 of tee-shaped geometry. The ends of the fuel flow and vapor recovery lines 16 and 18 are connected to a coupling flange 96 on one end of the pipe fitting 40 by means of the line adapter fittings and a circumferential clamp 102, all in the same manner as previously desired with respect to FIGS. 2–9 in relation to the pipe fitting 32. The tee pipe fitting 40 thus provides the primary fuel flow path 126 for passage of liquid fuel through one outlet to one of the dispensing pumps 14, as indicated by arrow 128, and through a second outlet for flow to one or more additional pumps 14, as indicated by arrow 130. Similarly, the vapor recovery conduit 124 of the tee fitting 40 provides a pair of vapor recovery passages for recirculation flow of recaptured fuel vapors to the vapor recovery line 18. Conveniently, the pair of tee fitting outlets 128 and 130 include additional coupling flanges 96 for face-to-face mounting respectively with mating flanges 132 on tubular extension conduits 134 and 136. Additional circumferential clamps 102 compressively retain each pair of facing flanges in sealed relation with an interposed gasket 100. Moreover, each extension conduit 134 and 136 includes a recessed seat or step 104 for seated reception of additional eccentric spiders 106 used to support and retain vapor extension lines 18' each having a tubular nipple 68 mounted on the end thereof, as previously described, for slide-fit reception into the vapor recovery conduit 124 of the tee fitting.

Figure 11:
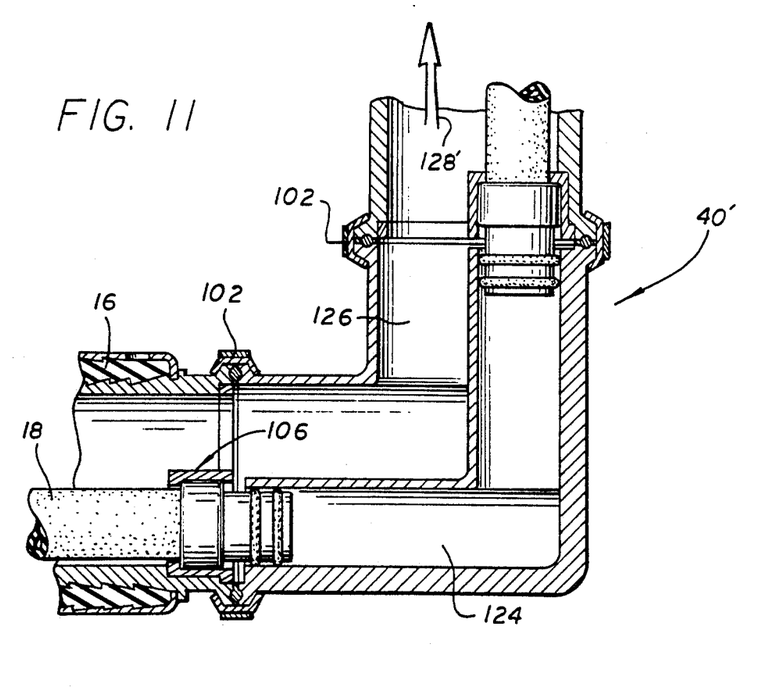
FIG. 11 is a fragmented sectional view illustrating connection of the fuel flow and vapor recovery lines to a biaxial pipe fitting of elbow-shaped configuration.

As shown by way of example in FIG. 1, each dispensing pump 14 associated with a common sump 26 may be associated with an underlying tee-shaped biaxial pipe fitting 40. With this arrangement, liquid fuel can be supplied to and excess vapor recovered from each one of several dispensing pups 14, while permitting the downstream tee fitting to be coupled through an opposite sump wall 30' via the multiaxial pipe system extension 10 to an additional sump (not shown) associated with one or more additional dispensing pumps. Alternately, as viewed in FIG. 11, the downstream pipe fitting associated with the final dispensing pump in the flow series may be associated with an elbow or L-shaped biaxial pipe fitting 40', having a single outlet 128' connected as previously described with respect to FIG. 10 for fuel flow delivery to and vapor recovery from the associated dispensing pump.

The fuel transfer pipe system of the present invention thus includes the fuel flow line 16 and the vapor recovery line 18 both safely encased within the buried containment conduit 20 extending in sealed relation between each adjacent pair of sumps. All three of these flow conduits are constructed from noncorrosive materials such as fiberglass to minimize and substantially eliminate risk of long term failure and fuel leakage to the surrounding soil. The adapter fittings mounted at the ends of the fuel flow and vapor recovery lines 16, 18 provide for quick and easy assembly of both lines in a single motion with an adjacent biaxial pipe fitting of brass or the like. The eccentric spider 106 at each coupling site retains and supports the vapor line 18 for positive slide-fit connection with the pipe fitting, while the sight port 92 in the outer clamp ferrule 84 permits simple visual inspection to insure full reception of the end of the fuel flow line 16 for safe and secure clamp-fit. The eccentric spider 106 additionally retains mounting the vapor recovery line 18 in a position rested generally at a bottom surface of the fuel flow line 16, in a manner which generally avoids significant elevational variations along the vapor recovery line which would otherwise contribute to vapor lock as recirculating vapors are recondensed to liquid form. Moreover, the narrow profile presented by the spider support arm 116 results in a maximum available flow area for liquid fuel flow. The entire system can be assembled quickly and easily, with the various clamps 102 fitted loosely about each mounted pair of coupling flanges. When all of the components are oriented in a desired precision orientation, the clamps 102 can be tightened quickly and easily to finalize the assembly process.

A variety of further modifications and improvements to the invention described herein will be apparent to those skilled in the art. Accordingly, no limitation on the invention is intended by way of the foregoing description and accompanying drawings, except as set forth in the appended claims.

What is claimed is:

1. A multiaxial fuel transfer pipe system, comprising:
   an outer containment conduit;
   means for connecting said outer containment conduit in sealed relation with an adjacent pair of sumps in a fuel transfer system, said containment conduit defining a passage extending between said sumps;
   a fuel flow line positioned within said outer containment conduit and extending between said sumps;
   a vapor recovery line positioned within said fuel flow line and extending between said sumps; and
   a first adapter fitting mounted onto an end of said vapor recovery line, a second adapter fitting mounted onto an adjacent end of said fuel flow line, and an eccentric spider mounted on said second adapter fitting for receiving and supporting said first adapter fitting in a position retaining said vapor recovery line offset from a central axis of said fuel flow line.

2. The fuel transfer pipe system of claim 1 wherein said outer containment conduit, said fuel flow line, and said vapor recovery line are all formed from a noncorrosive material.

3. The fuel transfer pipe system of claim 1 wherein said fuel flow line is oriented to extend generally horizontally between said sumps, and further including means for retaining said vapor recovery line in a position resting generally on a bottom interior surface of said fuel flow line.

4. The fuel transfer pipe system of claim 1 further including means for sealed interconnection of said outer containment conduit with an exterior surface of said fuel flow line within each of said sumps.

5. The fuel transfer pipe system of claim 1 further including a pair of biaxial pipe fittings disposed respectively within each of said sumps, and adapter fitting means for connecting said fuel flow line and said vapor recovery line at opposite ends thereof respectively to said pipe fittings.

6. The fuel transfer pipe system of claim 1 wherein said first adapter fitting comprises a tubular nipple mounted onto said vapor recovery line, and wherein said second adapter fitting comprises an inner mandrel received into said fuel flow line and cooperating within an outer ferrule mounted about said fuel flow line to receive and support said fuel flow line.

7. The fuel transfer pipe system of claim 6 further including a biaxial pipe fitting defining a vapor recovery flow path in parallel relation with a fuel flow path, said inner mandrel and said pipe fitting further including complementary coupling flanges adapted for face-to-face orientation with said fuel flow line and said fuel flow path in aligned relation, and a circumferential clamp for securely interconnecting said coupling flanges, said eccentric spider receiving and supporting said tubular nipple for slide-fit reception of said nipple into said vapor recovery flow path upon movement of said coupling flanges into face-to-face relation.

8. The fuel transfer pipe system of claim 6 wherein said ferrule has a sight port formed therein.

9. A multiaxial fuel transfer pipe system for use in transferring fuel between adjacent sumps in a fuel storage and dispensing system, wherein each of said adjacent sumps includes a sump wall having an opening formed therein, said transfer pipe system comprising:
   an outer containment conduit of noncorrosive material;
   means for connecting said containment conduit between the walls of the adjacent sumps such that said containment conduit defines a sealed passage communicating between the interiors of said sumps;
   a fuel flow line extending through said containment conduit and having opposite ends disposed within said sumps;
   a vapor recovery line extending through said fuel flow line and having opposite ends disposed within said sumps;
   a pair of biaxial pipe fittings mounted respectively within said pair of sumps, each of said pipe fittings including a vapor recovery path and a fuel flow path; and
   means for connecting the ends of said fuel flow and vapor recovery lines within said sumps to said pipe fittings with said fuel flow line in flow communication with said fuel flow paths of said pipe fittings, and with said vapor recovery line in flow communication with said vapor recovery paths of said pipe fittings;
   said means for connecting said fuel flow and vapor recovery lines to said pipe fittings comprising a first adapter fitting mounted at each end of said vapor recovery line, a second adapter fitting mounted at each end of said fuel flow line, and an eccentric spider mounted on each of said second adapter fittings for receiving and supporting the adjacent one of said first adapter fittings in a position retaining said vapor recovery line offset from a central axis of said fuel flow line.

10. The fuel transfer pipe system of claim 9 wherein one of said sumps includes means for connecting said pipe fitting therein to a fuel storage tank, and the other of said sumps includes means for connecting said pipe fitting therein to a fuel dispensing pump.

11. The fuel transfer pipe system of claim 9 wherein said containment conduit extends underground.

12. The fuel transfer pipe system of claim 9 wherein said fuel flow line is formed from a noncorrosive material.

13. The fuel transfer pipe system of claim 12 wherein said vapor recovery line is formed from a noncorrosive material.

14. The fuel transfer pipe system of claim 9 wherein said fuel flow line is oriented to extend generally horizontally between said sumps, and further including means for retaining said vapor recovery line in a position resting generally on a bottom interior surface of said fuel flow line.

15. The fuel transfer pipe system of claim 9 further including means for sealed interconnection of said outer containment conduit with an exterior surface of said fuel flow line within each of said sumps.

16. The fuel transfer pipe system of claim 15 further including means for pressurizing the space between said outer containment conduit and said fuel flow line.

17. The fuel transfer pipe system of claim 9 wherein each of said first adapter fittings comprises a tubular nipple mounted onto the end of said vapor recovery line, and wherein each of said second adapter fittings comprises an inner mandrel received into said fuel flow line and cooperating within an outer ferrule mounted about said fuel flow line to receive and support said fuel flow line.

18. The fuel transfer pipe system of claim 17 wherein each of said biaxial pipe fittings cooperates with the adjacent one of said second adapter fittings to define complementary coupling flanges adapted for face-to-face orientation with said fuel flow line and said fuel flow path in aligned relation, and further including a circumferential clamp for securely retaining said coupling flanges in face-to-face relation.

19. The fuel transfer pipe system of claim 18 where each of said eccentric spiders includes means for receiving and supporting the associated tubular nipple for slide-fit reception of said nipple into said vapor recovery flow path upon movement of said coupling flanges into face-to-face relation.

20. The fuel transfer pipe system of claim 17 wherein said ferrule has a sight port formed therein.

* * * * *